D. I. BEECHER.
Cotton-Planter.

No. 15,640. Patented Sept. 2, 1856.

UNITED STATES PATENT OFFICE.

D. I. BEECHER, OF GREENVILLE, MISSISSIPPI.

IMPROVEMENT IN COTTON-SEED PLANTERS.

Specification forming part of Letters Patent No. 15,640, dated September 2, 1856.

*To all whom it may concern:*

Be it known that I, D. I. BEECHER, of Greenville, in the county of Washington and State of Mississippi, have invented a new and useful Improvement in Cotton-Seed Planters; and I do hereby declare that the following is a full, clear, and exact description of the construction and operation of the same, reference being had to the annexed drawings, forming part of this specification, in which—

Figure 1:
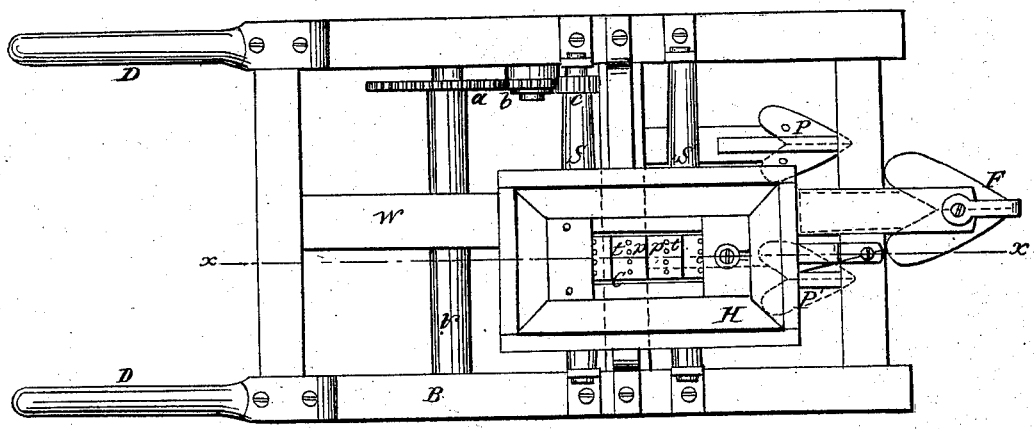
Figure 2:
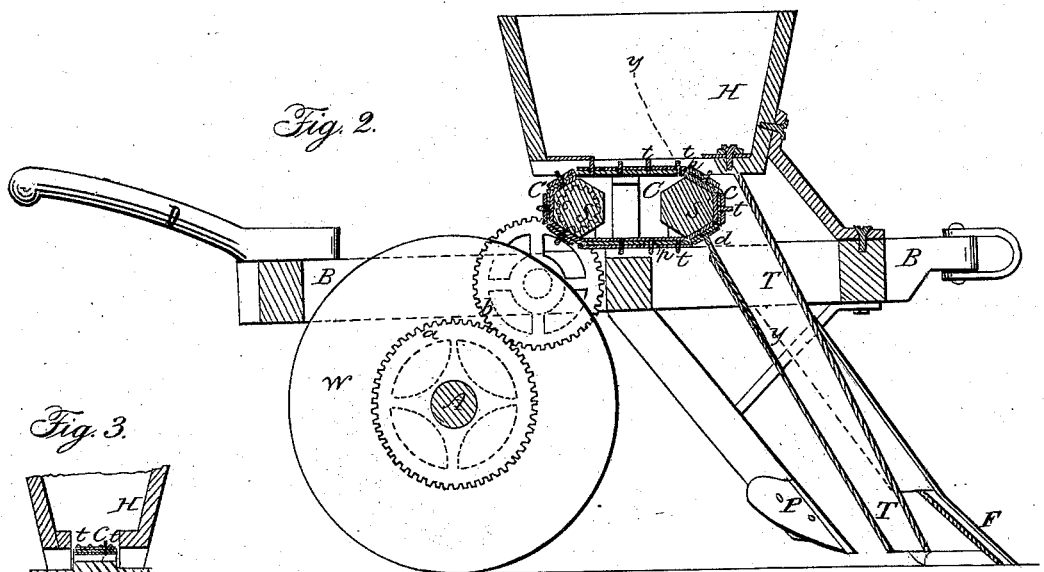
Figure 3:
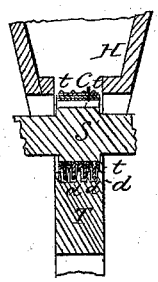

Figure 1 is a top view of the planter. Fig. 2 is a vertical section on $x\,x$. Fig. 3 is a section on $y\,y$ perpendicular to plane of section shown in Fig. 2.

Similar characters of reference in the several figures denote the same part of the planter.

The nature of my invention consists in the combination of a discharge-tube whose rear upper extremity is slotted, as will be described, with a series of plates armed with pins and constituting an endless discharge-apron whose upper surface passes along the bottom of the hopper, so that the teeth of the plates shall pass between the slots of the tube, this construction being for insuring the delivery of the seed into the tube, as will be hereinafter set forth.

In the drawings, H is the hopper, along the bottom of which passes an endless conveyer, C, made up of a series of plates, $p$, armed with rows of teeth $t$. This conveyer is held upon two polygonal shafts, S S', and receives motion from the main axle A through gearing-connection $a\,b\,c$. This conveyer carries the seed downward into a discharge-tube, T, whose rear upper extremity has a series of slots, $d$, as shown in Fig. 3. The teeth $t$ of the plates $p$ pass through the slots $d$ and effect the delivery of the seed into the tube, the passage of the teeth through the slots preventing the seed from being carried around with the teeth by the adhering of the fibers remaining upon the seed to said teeth.

F is the furrow-opener, and P P' are the coverers. B is the frame; D D, the handles, and W the main wheel.

What I claim, and desire to secure by Letters Patent, is—

The combination of the endless series of armed plates with the slotted discharge-tube, constructed, arranged, and operating substantially as and for the purposes set forth.

In testimony whereof I have hereunto signed my name before two subscribing witnesses.

D. I. BEECHER.

Witnesses:
GEO. PATTEN,
JOHN S. HOLLINGSHEAD.